United States Patent
Kumar

(10) Patent No.: US 11,418,938 B1
(45) Date of Patent: Aug. 16, 2022

(54) LOCATION-ASSISTED IN-VEHICLE SYSTEM (IVS) MODEM CONFIGURATION MANAGEMENT

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/212,823

(22) Filed: Mar. 25, 2021

(51) Int. Cl.
  *H04W 4/50* (2018.01)
  *H04W 4/029* (2018.01)
  *H04W 8/18* (2009.01)
  *H04W 4/40* (2018.01)

(52) U.S. Cl.
  CPC .............. *H04W 4/50* (2018.02); *H04W 4/029* (2018.02); *H04W 4/40* (2018.02); *H04W 8/183* (2013.01)

(58) Field of Classification Search
  CPC ......... H04W 4/50; H04W 4/029; H04W 4/40; H04W 8/183
  See application file for complete search history.

(56) References Cited

U.S. PATENT DOCUMENTS

| 10,638,281 | B1* | 4/2020 | Mezaael | H04W 4/46 |
| 2015/0358798 | A1 | 12/2015 | Okawa et al. | |
| 2019/0166451 | A1* | 5/2019 | Mishra | H04W 72/0453 |
| 2019/0390963 | A1 | 12/2019 | Kumar et al. | |
| 2020/0113015 | A1 | 4/2020 | Basu Mallick et al. | |
| 2020/0169849 | A1 | 5/2020 | Agarwal et al. | |
| 2020/0236614 | A1* | 7/2020 | Hedberg | H04W 8/22 |

OTHER PUBLICATIONS

International Search Report and Written Opinion—PCT/US2022/013837—ISA/EPO—dated May 27, 2022.

* cited by examiner

*Primary Examiner* — Brandon J Miller
(74) *Attorney, Agent, or Firm* — Campbell C. Chiang; MG-IP Law, P.C.

(57) ABSTRACT

Disclosed are techniques for wireless communication. In an aspect, a vehicle user equipment (V-UE) determines an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE, and updates a configuration of the IVS modem, switching the C-V2X service from the first network access subscription to the second network access subscription or from the second network access subscription to the first network access subscription, or both, based on the availability of the C-V2X service.

48 Claims, 6 Drawing Sheets

LOCATION-ASSISTED IN-VEHICLE SYSTEM (IVS) MODEM CONFIGURATION MANAGEMENT

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a vehicle user equipment (V-UE) includes determining an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and updating a configuration of the IVS modem, switching the C-V2X service from the first network access subscription to the second network access subscription or from the second network access subscription to the first network access subscription, or both, based on the availability of the C-V2X service.

In an aspect, a vehicle user equipment (V-UE) includes a memory; a modem; and at least one processor communicatively coupled to the memory and the modem, the at least one processor configured to: determine an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and update a configuration of the IVS modem, switching the C-V2X service from the first network access subscription to the second network access subscription or from the second network access subscription to the first network access subscription, or both, based on the availability of the C-V2X service.

In an aspect, a vehicle user equipment (V-UE) includes means for determining an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and means for updating a configuration of the IVS modem, switching the C-V2X service from the first network access subscription to the second network access subscription or from the second network access subscription to the first network access subscription, or both, based on the availability of the C-V2X service.

In an aspect, a non-transitory computer-readable medium stores computer-executable instructions that, when executed by a vehicle user equipment (V-UE), cause the vehicle user equipment (V-UE) to: determine an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and update a configuration of the IVS modem, switching the C-V2X service from the first network access subscription to the second network access subscription or from the second network access subscription to the first network access subscription, or both, based on the availability of the C-V2X service.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
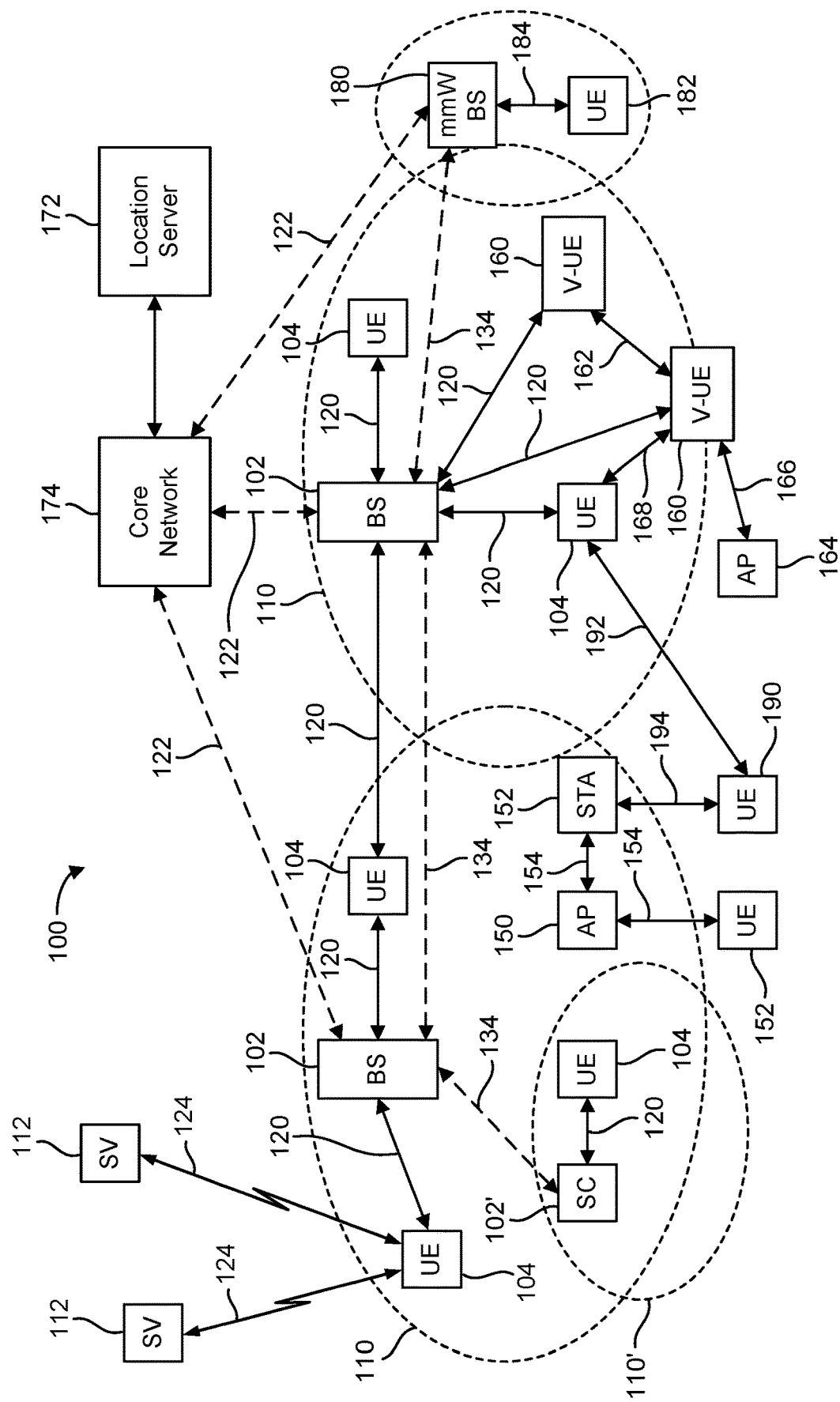
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as an in-vehicle system (IVS), a navigation system, a warning system, a heads-up display (HUD), an on-board computer, an in-vehicle infotainment (IVI) system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference rafio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (C-V2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be C-V2X links. A first generation of C-V2X has been standardized in LTE, and the next generation is expected to be defined in NR. C-V2X is a cellular technology that also enables device-to-device communications. In the U.S. and Europe, C-V2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
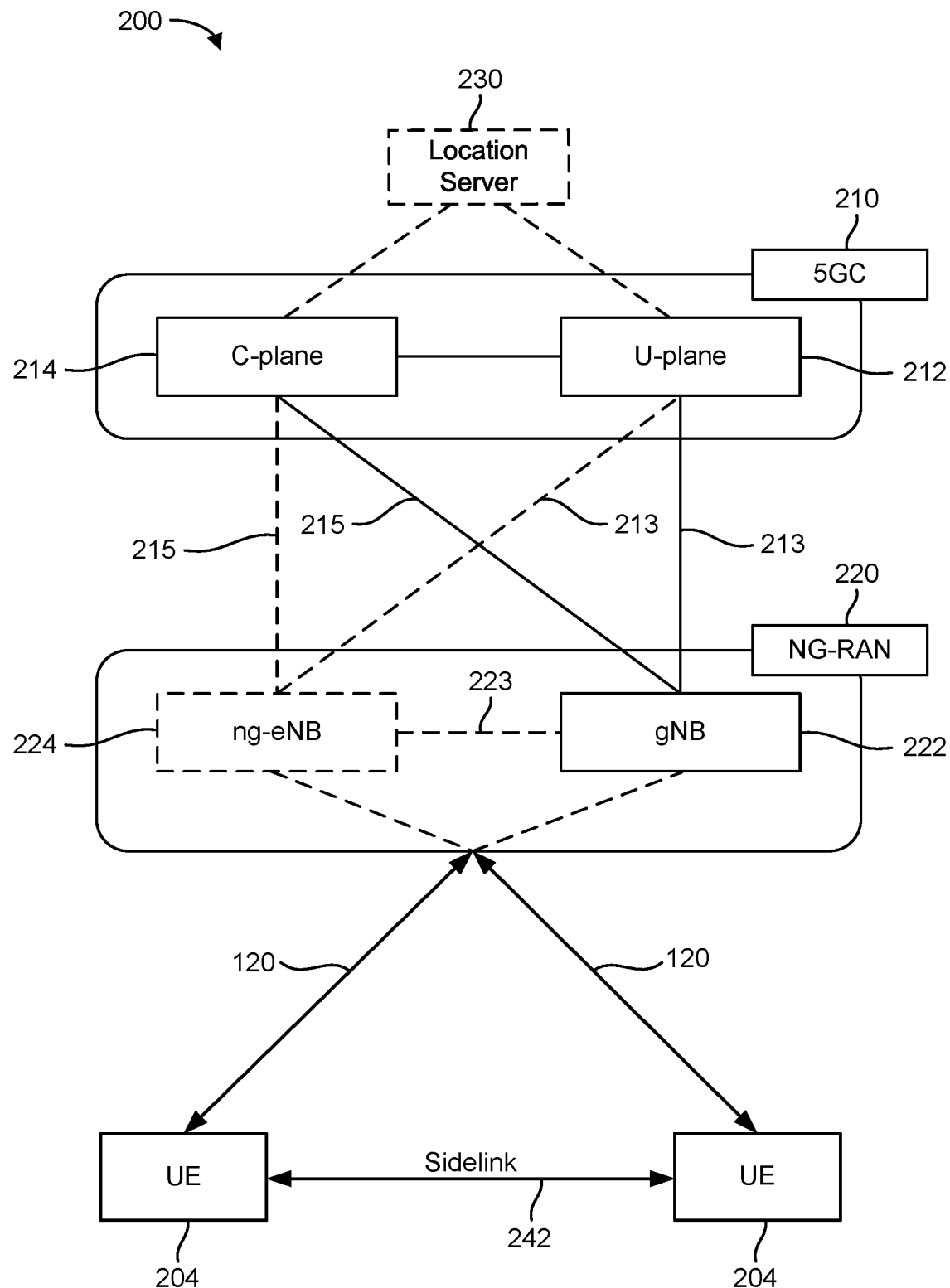
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either (or both) gNB 222 or ng-eNB 224 may communicate with UEs 204 (e.g., any of the UEs described herein). In an aspect, two or more UEs 204 may communicate with each other over a wireless sidelink 242, which may correspond to wireless sidelink 162 in FIG. 1. Alternatively, one of the UEs 204 may instead be a roadside access point or some other type of access point.

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
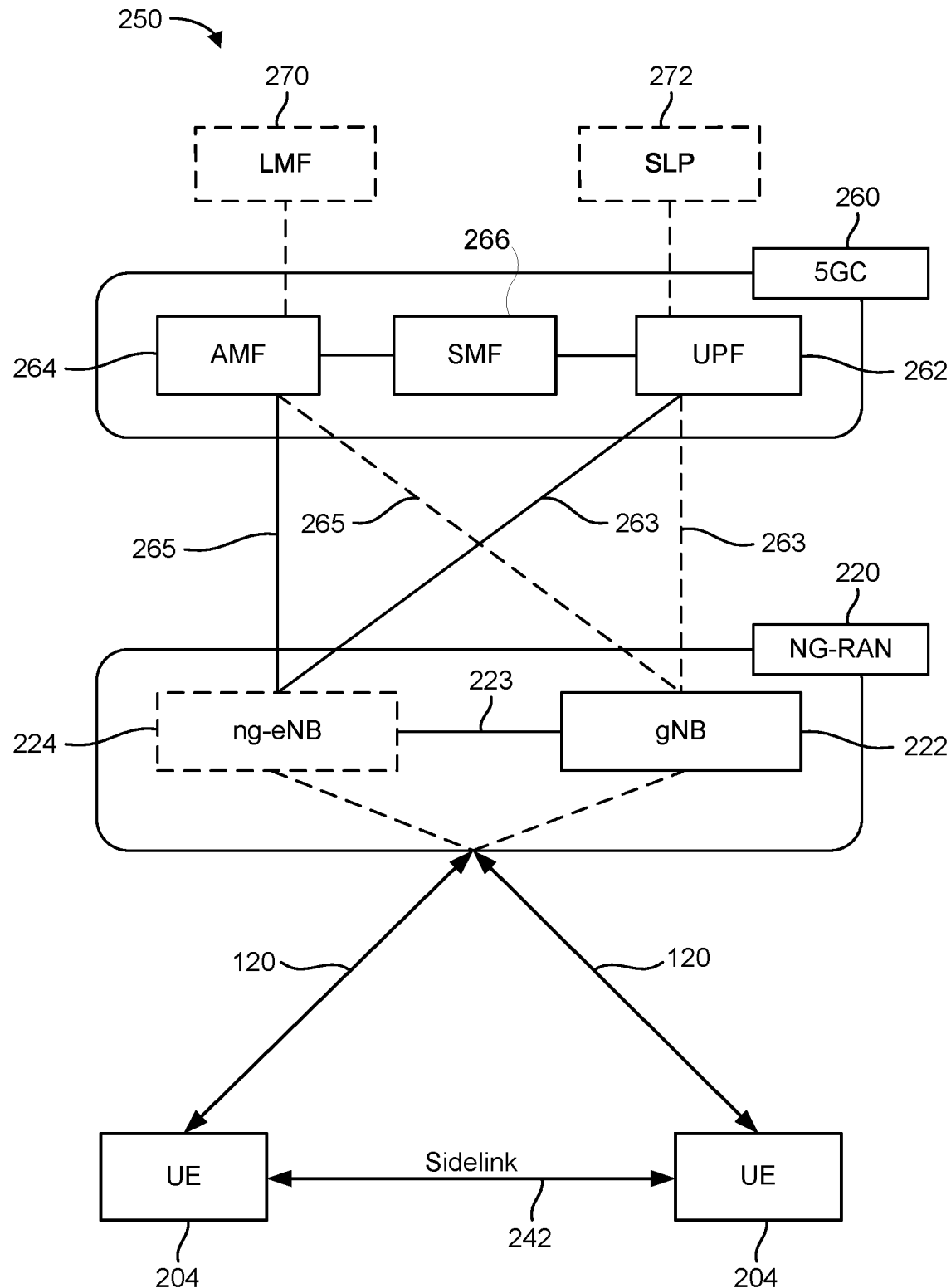

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. The base stations of the NG-RAN 220 communicate with the AMF 264 over the N2 interface and with the UPF 262 over the N3 interface. Either (or both) gNB 222 or ng-eNB 224 may communicate with UEs 204 (e.g., any of the UEs described herein). In an aspect, two or more UEs 204 may communicate with each other over a sidelink 242, which may correspond to sidelink 162 in FIG. 1. Alternatively, one of the UEs 204 may instead be a roadside access point or some other type of access point.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 which acts as a location server 230, transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270 but, whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g. using protocols intended to carry voice and/or data like the transmission control protocol (TCP) and/or IP).

Figure 3:
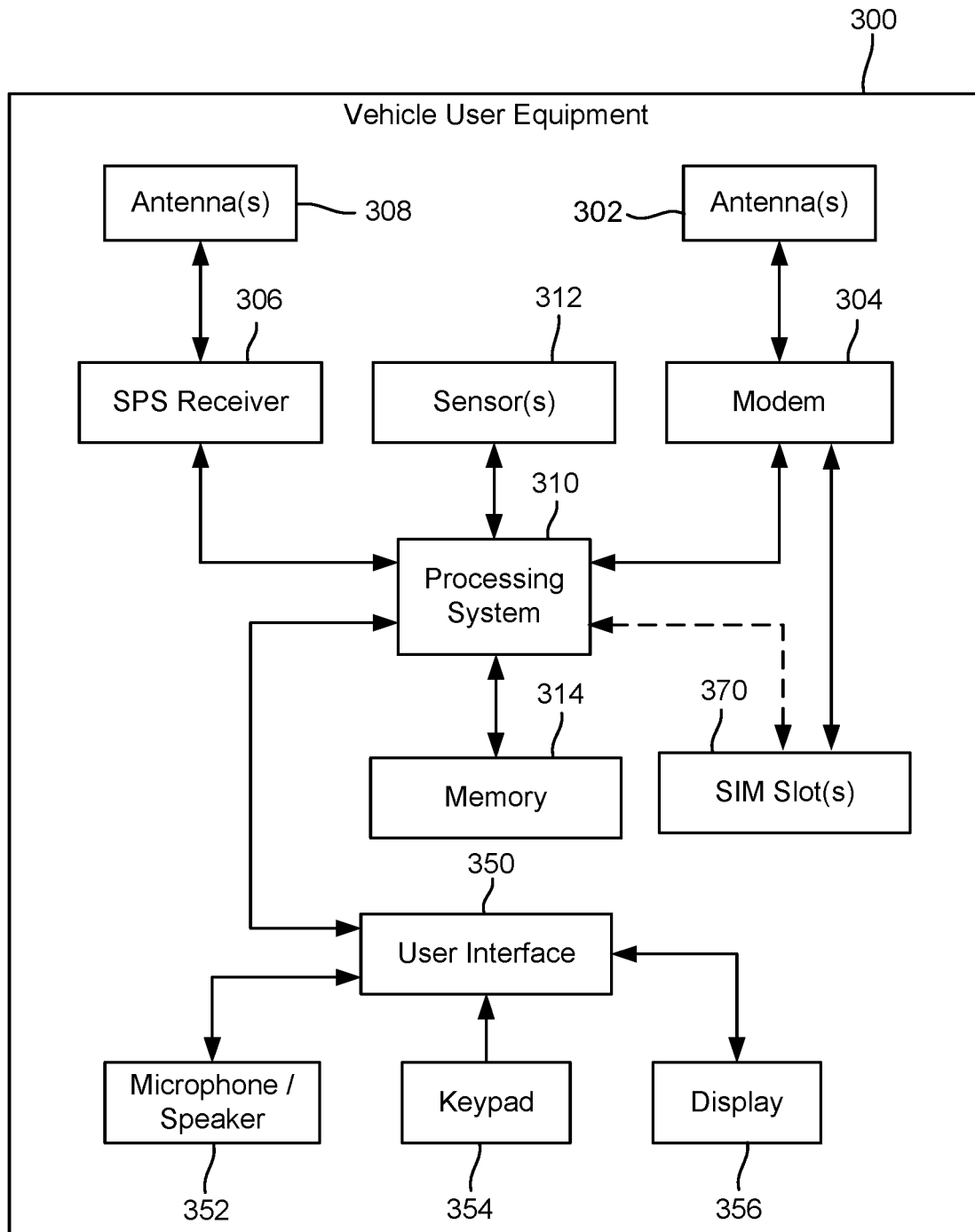
FIG. 3 is a block diagram illustrating various components of an example vehicle user equipment (V-UE), according to aspects of the disclosure.

FIG. 3 is a block diagram illustrating various components of an example V-UE 300, according to aspects of the disclosure. In an aspect, the V-UE 300 may correspond to an IVS. For the sake of simplicity, the various features and functions illustrated in the block diagram of FIG. 3 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual IVS. For example, the various components illustrated in FIG. 3 may be distributed throughout a vehicle, rather than being contained in a single "box" (although this is also possible). Further, it is also recognized that one or more of the features or functions illustrated in the example of FIG. 3 may be further subdivided, or two or more of the features or functions illustrated in FIG. 3 may be combined.

The V-UE 300 may include a modem 304 (e.g., an IVS modem) connected to one or more antennas 302 and providing means for communicating (e.g., means for transmitting, means for receiving, means for measuring, means for tuning, means for refraining from transmitting, etc.) with other network nodes, such as other V-UEs (e.g., V-UEs 160), infrastructure access points (e.g., roadside access point 164), P-UEs (e.g., UEs 104), base stations (e.g., base stations 102), etc., via at least one designated RAT (e.g., C-V2X, LTE, NR, IEEE 802.11p, etc.) over one or more communication links (e.g., communication links 120, sidelinks 162, 166, 168, mmW communication link 184). The modem 304 may be variously configured for transmitting and encoding signals (e.g., messages, indications, information, and so on), and, conversely, for receiving and decoding signals (e.g., messages, indications, information, pilots, and so on) in accordance with the designated RAT(s).

In an aspect, the modem 304 may be configured to support dual SIM (subscriber identity module) dual active (DSDA)

mode. In DSDA mode, the modem 304 can provide an independent network connection, or communication link, for each of two network access subscriptions. That is, the modem 304 may be able to send and receive data over two network connections (e.g., communication links 120, sidelinks 162, 166, 168, mmW communication link 184, D2D P2P link 192) simultaneously. The two independent connections, or links, may use the same RAT or different RATs, depending on the capabilities of the modem 304. Each subscription may be associated with, and identified by, a SIM. In an IVS scenario, one subscription may be for the original equipment manufacture (OEM) and the other may be for a user associated with the vehicle (e.g., either the driver or a passenger).

In order to support DSDA mode, the modem 304 includes at least two RF receive chains and at least two RF transmit chains, with at least one RF receive chain and at least one RF transmit chain associated with each active subscription. An RF chain (whether receive or transmit) is a cascade of electronic components, such as amplifiers (e.g., low noise amplifiers (LNAs) for RF receive chains and power amplifiers (PAs) for RF transmit chains), filters, mixers, attenuators, and detectors, configured to receive an incoming analog signal (in the case of an RF receive chain) or transmit an outgoing analog signal (in the case of an RF transmit chain). Each RF receive chain is coupled to at least one antenna 302 on one end and an analog-to-digital converter (ADC) on the other. Each RF transmit chain is coupled to an antenna 302 on one end and a digital-to-analog converter (DAC) on the other.

The ADC of each RF receive chain may be, but need not be, coupled to the same digital receive circuitry of the modem 304 (e.g., a signal demodulator, packet processor, etc.), and the DAC of each RF transmit chain may be, but need not be, coupled to the same digital transmit circuitry of the modem 304 (e.g., a signal modulator, packet processor, etc.). The combination of an RF receive chain and the digital receive circuitry is referred to as a "receiver" and the combination of an RF transmit chain and the digital transmit circuitry is referred to as a "transmitter." The combination of one or more receivers and one or more transmitters in the same circuit is referred to as a "transceiver." Thus, although multiple RF chains may be coupled to the same digital circuitry, where the modem 304 supports DSDA mode, the modem 304 is considered to have at least two receivers and at least two transmitters (at least one receiver and at least one transmitter per subscription) or at least two transceivers.

Each receiver (of a transceiver) may be coupled to its own antenna(s) 302, separate from the antenna(s) 302 of another receiver. Similarly, each transmitter (of a transceiver) may be coupled to its own antenna(s) 302, separate from the antenna(s) 302 of another transmitter. However, the receiver (s) and transmitter(s) of a transceiver may share the same antenna(s) 302, such that the transceiver cannot receive and transmit at the same time. Alternatively, the different receivers and transmitters may have their own receive and transmit antennas 302, respectively. In an aspect, although referred to as individual antennas, the antenna(s) 302 may each be an antenna array that permits the modem 304 to perform transmit and/or receive "beamforming," as described herein.

In an aspect, the modem 304 may have one or more first transceivers (or set of receivers and transmitters) capable of communicating via a first frequency range and one or more second transceivers (or set of receivers and transmitters) capable of communicating via a second frequency range. For example, the modem 304 may have an FR1/sub-6 GHz transceiver and a FR2/mmW transceiver, or some combination thereof. Where the modem 304 supports DSDA mode, one subscription may be assigned to one transceiver and the other subscription may be assigned to another transceiver, or the subscriptions may share transceiver resources (e.g., RF receive and/or transmit chains of the shared transceiver(s)). For example, a 5G network may operate as either a standalone (SA) network or a non-standalone (NSA) network. A 5G SA network is designed to provide 5G connectivity without having to utilize existing network architecture (e.g., a legacy LTE network) and includes a 5GC (e.g., 5GC 210/260). In such a network, legacy carriers (e.g., LTE, 3G, GSM, etc.) can be used as secondary carriers, while the 5G carrier can be used for the anchor carrier. As will be appreciated, an LTE network can also operate in either SA or NSA mode.

In an NSA 5G network, a UE (e.g., V-UE 300) connects to an LTE eNB as the primary node for mobility management and network coverage, and one or more additional 5G gNBs as secondary nodes for enhanced coverage and/or throughput. This solution enables operators to provide 5G services sooner and at lower cost. More specifically, 5G infrastructure (e.g., gNB physical sites) can be added to geographic areas currently served by LTE networks, thereby providing both LTE and 5G service in those areas. Legacy UEs (i.e., those only capable of LTE or earlier network access) can connect to the existing LTE networks, while dual connectivity UEs can connect to both the LTE and 5G networks.

Typically, the same FR1/sub-6 GHz transceiver can support multiple network connections (e.g., on different carrier frequencies), whereas, due to the higher capabilities required for 5G mmW communication, an FR2/mmW transceiver may only support one network connection. Thus, where the modem 304 is capable of DSDA mode, it may be able to support an active 5G SA subscription (on the FR2/mmW transceiver) and an active LTE subscription (on the FR1/sub-6 GHz transceiver), or an active 5G NSA subscription and an active LTE subscription (with the 5G NSA using both the FR1/sub-6 GHz and FR2/mmW transceivers), or two active LTE subscriptions (sharing the FR1/sub-6 GHz transceiver), but may not be able to support two active 5G subscriptions.

The modem 304 may also be coupled to one or more SIM slots 370. The SIM slot(s) 370 may be physical or logical, or one may be physical and another logical. A physical SIM slot 370 is the physical opening into which a physical SIM card can be inserted. A logical SIM slot 370 may be a memory circuit, possibly including some low-level processing circuitry, storing the information of a particular SIM (referred to as a "clone" of the SIM). A SIM may be cloned to a logical SIM slot 370 via some short-range wireless protocol, such as the Bluetooth SIM access profile (SAP) protocol. For example, a user may establish a Bluetooth connection between their smartphone (containing the user's SIM) and the V-UE 300 (where the V-UE 300 is an IVS) and transfer their SIM information to the logical SIM slot 370 via the Bluetooth connection. In some cases, the information for multiple SIMs can be stored in a local memory (e.g., memory 314) and one may be selected and cloned to a logical SIM slot 370.

The V-UE 300 may also include, or be communicatively coupled to, a satellite positioning service (SPS) receiver 306. The SPS receiver 306 may be connected to the one or more antennas 308 and may provide means for receiving and/or measuring satellite signals. The SPS receiver 306 may comprise any suitable hardware and/or software for receiving and processing SPS signals, such as global positioning system (GPS) signals. The SPS receiver 306 requests information and operations as appropriate from the other systems, and performs the calculations necessary to determine the V-UE's 300 position using measurements obtained by any suitable SPS algorithm.

One or more sensors 312 may be coupled to a processing system 310 and may provide means for sensing or detecting information related to the state and/or environment of the V-UE 300, such as speed, heading (e.g., compass heading), headlight status, gas mileage, etc. By way of example, the one or more sensors 312 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The processing system 310 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The processing system 310 may therefore provide means for processing, such as means for determining, means for calculating, means for receiving, means for transmitting, means for indicating, etc. The processing system 310 may include any form of logic suitable for performing, or causing the components of the V-UE 300 to perform, at least the techniques described herein.

The processing system 310 may also be coupled to a memory 314 providing means for storing (including means for retrieving, means for maintaining, etc.) data and software instructions for executing programmed functionality within the V-UE 300. The memory 314 may be on-board the processing system 310 (e.g., within the same integrated circuit (IC) package), and/or the memory 314 may be external to the processing system 310 and functionally coupled over a data bus.

The V-UE 300 may optionally include, or be communicatively coupled to, a user interface 350 (e.g., in the dashboard and/or cabin of the vehicle within which the V-UE 300 is installed) that provides any suitable interface systems, such as a microphone/speaker 352, keypad 354, and display 356 that allow user interaction with the V-UE 300. The microphone/speaker 352 may provide for voice communication services with the V-UE 300. The keypad 354 may comprise any suitable buttons for user input to the V-UE 300. The display 356 may comprise any suitable display, such as, for example, a backlit liquid crystal display (LCD), and may further include a touch screen display for additional user input modes. The user interface 350 may therefore be a means for providing indications (e.g., audible and/or visual indications) to a user and/or for receiving user input (e.g., via user actuation of a sensing device such a keypad, a touch screen, a microphone, and so on).

Having in-vehicle cellular connectivity is becoming increasingly important. For example, requirements have been introduced for full-fledged cellular modem-powered IVS' in order to support, among other services, emergency calls (eCalls) and V2X communication (including C-V2X communication). The design of an IVS modem (e.g., modem 304) generally supports a specific maximum performance/capability envelope based on the hardware capabilities of the IVS modem (e.g., RF, baseband, and CPU availability).

C-V2X uses LTE and/or NR cellular connectivity to send and receive messages from one IVS to other IVS', pedestrians, or fixed objects in the vehicle's surroundings, such as highway infrastructure, roadside access points, and the like. C-V2X commonly uses the 5.9 GHz frequency band, which is the ITS frequency band in most countries. C-V2X can function without network assistance and has a range that exceeds a mile. C-V2X is currently standardized in 3GPP Technical Specification (TS) 38.886, which is publicly available and incorporated by reference herein in its entirety.

For V2X (including C-V2X) technology to be useful, there needs to be V2X support infrastructure, such as other C-V2X-capable vehicles, C-V2X infrastructure support (e.g., roadside units), and C-V2X support from the cellular access network (e.g., an LTE and/or 5G network). Additionally, C-V2X is more useful is dense traffic areas than on long straight freeways. Note that as used herein, the term "V2X" refers to C-V2X, unless non-cellular V2X is indicated (specifically or by context).

In some cases, as described above with reference to FIG. 3, an IVS modem (e.g., modem 304) may be capable of supporting multiple (typically two) SIMS. Such an IVS modem may have multiple physical and/or logical "slots" for the multiple SIMs (e.g., SIM slots 370). One SIM is for the OEM and is used for sending alerts to the user (e.g., ADAS alerts, alerts from roadside infrastructure, etc.) and collecting any necessary information (e.g., from other in-vehicle systems, other V-UEs, roadside infrastructure, etc.). The other subscription slot can be used to clone a user subscription onto the IVS modem using a short-range wireless protocol such as a Bluetooth SAP protocol, as described above. While an IVS modem may only support two subscriptions at a time, multiple user subscriptions can be cloned onto the user SIM slot, but only one can be active at one time.

Figure 4:
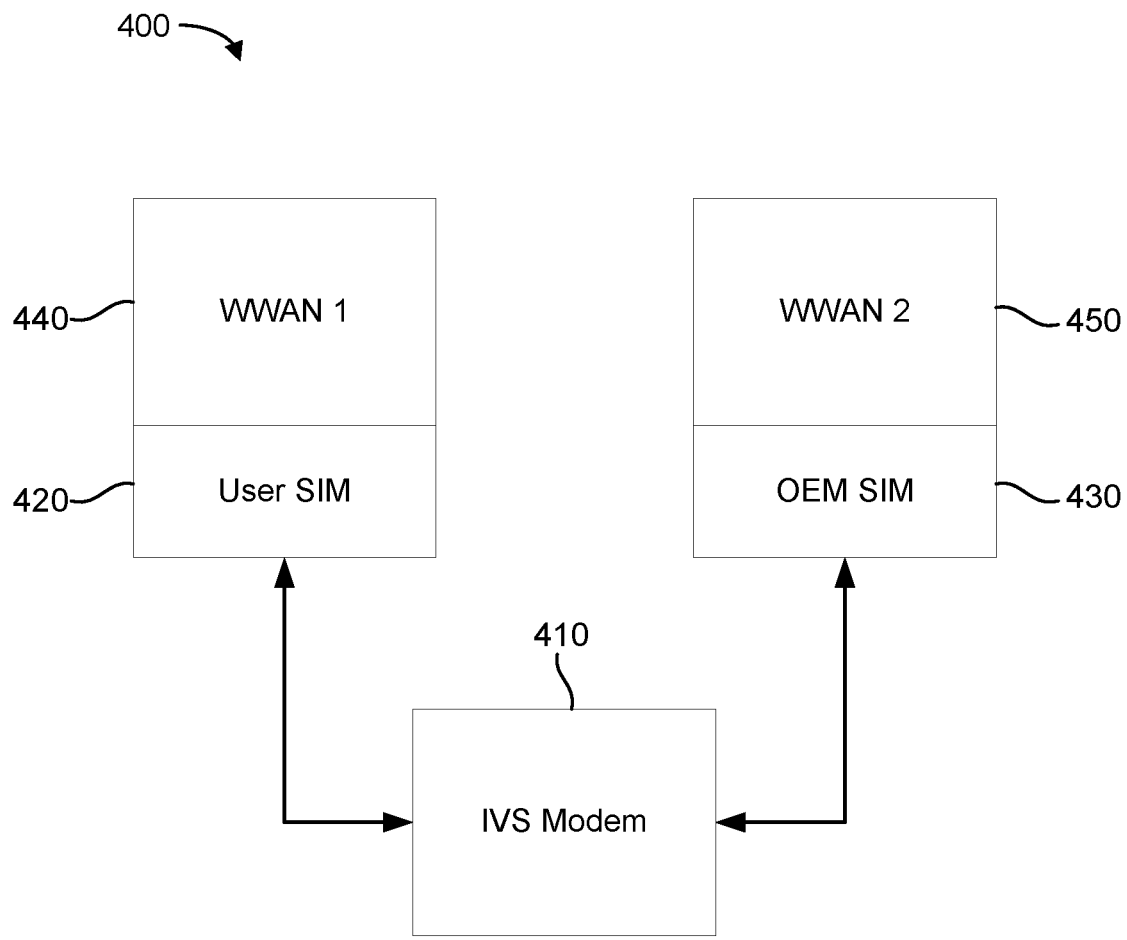
FIG. 4 is a diagram of an example scenario in which an IVS modem is associated with two subscriber identity modules (SIMs), according to aspects of the disclosure.

FIG. 4 is a diagram 400 of an example scenario in which an IVS modem 410 is associated with two SIMs, according to aspects of the disclosure. The IVS modem 410 may correspond to modem 304 in FIG. 3. In the example of FIG. 4, the first SIM is a user SIM 420 and the second SIM is an OEM SIM 430. The user SIM 420 allows the IVS modem 410 to connect to a first WWAN 440 (labeled "WWAN 1") and the OEM SIM 430 allows the IVS modem 410 to connect to a second WWAN 450 (labeled "WWAN 2"). The first WWAN 440 and the second WWAN 450 may be the same (e.g., both NR, both LTE, etc.) or different (e.g., one NR, one LTE).

An IVS modem (e.g., modem 304) may have different boot-up modes, where each mode can support a specific performance/capability envelope. The types of capabilities may include the number of active subscriptions, the number of supported RATs, the capabilities of each RAT, the types of RATs, and the like. For example, the assignment of modem resources (e.g., transceivers and/or RF chains) to subscriptions may occur at modem boot-up and depend on the types and/or priorities of the subscriptions. For example, one subscription may be a 5G subscription and the other an LTE subscription, and/or the OEM subscription may have a higher priority than the user subscription(s) and may therefore be assigned more resources, or may be assigned resources preferentially over the user subscription(s).

Due to the capabilities of an IVS modem (e.g., modem 304), when the IVS modem needs to support C-V2X communication, the IVS modem needs to be configured in a single SIM (SSIM) mode, whereas without the need to support C-V2X communication, an IVS modem can support multi-SIM (MSIM) mode. That is, when supporting C-V2X communication, an IVS modem can only support the OEM subscription (dedicated to C-V2X communication), whereas when not supporting C-V2X communication, an IVS modem can support two simultaneous subscriptions (the OEM subscription and one or more user subscriptions). The OEM subscription in the latter case does not implement C-V2X, but may implement other V2X communication (e.g., over LTE, 802.11p).

The configuration of an IVS modem (e.g., modem 304) at boot-up is either set by the OEM statically or, if the IVS modem is configured in MSIM mode (i.e., without C-V2X connectivity), the user is prompted to clone a user subscription to the second SIM slot (e.g., one of SIM slots 370) of the IVS modem. As a specific example of different IVS modem configurations that may be supported, a first mode may configure the modem for 5G SSIM operation without C-V2X. This would be a baseline configuration when mmW communication is not desired or needed. A second mode may configure the modem to operate in DSDA mode without C-V2X. In this case, there may be two active SA subscriptions (one 5G and one LTE or both LTE), neither of which provides C-V2X service. Alternatively, there may be an active 5G NSA subscription and an active LTE subscription. A third mode may configure the modem to operate in a 5G SSIM mode, which would provide one C-V2X sidelink. A fourth mode may configure the modem to operate in an LTE SSIM mode, which would again provide one C-V2X sidelink. These configurations are summarized in the following table.

TABLE 1

| Mode | SIM Mode | C-V2X | SA | NSA |
| --- | --- | --- | --- | --- |
| 1 | 5G SSIM | No | 5G | 5G |
| 2 | DSDA | No | 5G, LTE | 5G |
| 3 | 5G SSIM | Yes | 5G | 5G |
| 4 | LTE SSIM | Yes | LTE | LTE |

The possible modem configurations described above create various limitations. For example, the IVS modem is not capable of supporting two concurrent voice calls (i.e., one for each subscription in MSIM mode), as that would prevent one of the subscriptions being used for C-V2X. Instead, there are different levels of throttling that would be needed to allow for concurrent voice calls. For example, for an IVS modem in DSDA-only mode (Mode 2 in Table 1), only throttling at the carrier frequency level would be needed. For an IVS modem in SSIM plus C-V2X mode (Modes 3 and 4 in Table 1), only carrier frequency throttling would be needed.

The present disclosure provides techniques for intelligently determining the best modem configuration for the IVS based on various factors, such as C-V2X availability, the vehicle's travel route, the vehicle's current location, and the vehicle's need for and the usefulness of C-V2X communication at a given time. In addition, the present disclosure provides techniques to determine the preferred subscription to clone to the second subscription slot of the IVS modem.

The present disclosure proposes a crowdsourcing framework to crowdsource various information related to the availability of V2X (including C-V2X). The crowdsourced information may be gathered by a server, such as location server 172, one or more cloud-based servers, a third-party server, etc. The crowdsourced information may include the locations of roadside access points and other roadside infrastructure (that provide C-V2X access) and current and historic C-V2X availability along the roadways tracked by the crowdsourcing server. The crowdsourcing server may store information for all of the roads in a particular municipality (e.g., a county, state, country, continent, etc.) or only certain types of roads (e.g., state highways, federal highways, toll roads, etc.).

The current and historic C-V2X availability may be based on V2X-capable vehicles (i.e., V-USs) reporting the availability of C-V2X connectivity as they travel. Over time (e.g., days, weeks, months), the crowdsourcing server can build a map of C-V2X availability along the roadways that it tracks. In addition, because V2X-capable vehicles report C-V2X availability in real-time (or near real-time), the map of C-V2X availability would also include the current availability of C-V2X. As will be appreciated, the information representing the current C-V2X availability will be sparser (i.e., fewer data points) than the information representing the historic C-V2X availability.

Information such as the location of roadside units, or other connected roadside infrastructure, is generally static, and therefore, this location information can be obtained and stored when it is generated (e.g., when the roadside unit is installed/deployed). Other information, such as information generated by V2X-capable vehicles (V-UEs), is dynamic, and can be reported to the crowdsourcing server as it is generated (i.e., in real-time), periodically (e.g., every minute, every hour, once per day, weekly, etc.), or on-demand (i.e., when requested by the crowdsourcing server).

In an aspect, the C-V2X availability map may comprise a set of points indicating that C-V2X connectivity is available at that point. Each point may represent a location at which a V2X-capable vehicle reported that C-V2X connectivity was available. Each point may be associated with various information about the C-V2X availability, such as the WWAN (e.g., LTE or 5G), the signal strength, an identifier of the road, an identifier of the reporting vehicle (although this may be omitted for user privacy), an identifier of the access point providing the C-V2X connectivity, the geographic coordinates of the point, and/or the like. In this way, the C-V2X availability map may be represented as a "heat map," with larger and/or denser clusters of points indicating greater C-V2X availability.

As part of determining a route to a destination (e.g., based on a user entering an address into a navigation system of the vehicle), the IVS of a C-V2X-capable vehicle can request and download the relevant crowdsourced data from the crowdsourcing server. Alternatively, the IVS can upload the planned route and the crowdsourcing server can provide the C-V2X availability information for that route. This may be less desirable, however, for user privacy reasons. Regardless of how obtained, the IVS can determine the availability of V2X connectivity (and therefore V2X assistance) along the determined travel route. The IVS may then provide this information to the navigation system (if separate from the IVS) to, for example, output to the user, or even to alter the determined route based on certain areas having better or worse C-V2X connectivity than others.

In an aspect, whether or not the IVS determines C-V2X availability along a planned route, or updates a planned route based on C-V2X availability in the general area of the route, may be based on the user's preference (e.g., some users may not be concerned with C-V2X availability while others may have a high preference for it), traffic conditions on the planned route (e.g., increased traffic congestion, or congestion above some threshold, may make C-V2X connectivity a higher priority), hazards along the route (e.g., known blind spots, the number of intersections, the presence of accident-prone zones, and the like along the route), and/or the like.

In addition to the crowdsourced C-V2X availability information, the IVS may also use the presence/detection of C-V2X system information blocks (SIBs) (e.g., SIB-9, SIB-17, SIB-21) to determine whether the network actually supports C-V2X at its current location along the travel route (since the crowdsourced information may not be sufficiently precise, or available, for the vehicle's current location). Once the C-V2X availability information has been obtained from all available sources and a final route determined, this information can be used in different ways. In an aspect, the IVS can use the C-V2X availability information to optimize the IVS modem configuration along the route. The IVS can also base the modem configuration on other factors besides the availability of C-V2X, such as the user's preferences and the need for C-V2X connectivity along the route, similar to the factors for whether or not to obtain C-V2X availability along the planned route.

A set of rules, or heuristics, may be defined for how to configure the IVS modem (e.g., modem 304) based on the current, or expected, C-V2X availability and other factors indicating whether or not there is a need for C-V2X connectivity (e.g., user preferences, traffic conditions, route hazards, etc.). For example, when C-V2X connectivity is available (as determined from the crowdsourced data and the detection of C-V2X SIBs) and there is a need for it, the IVS can configure the modem to operate in C-V2X mode and SSIM mode (thereby restricting operation to the OEM SIM). If C-V2X connectivity is not available or not needed, then the IVS can configure the modem to operate in MSIM mode (thereby enabling a user SIM).

In an aspect, the C-V2X availability information (both crowdsourced and detected by the IVS) can be provided to the OEM's server and the OEM can dynamically control the configuration of the modem based on the above considerations (e.g., availability, need, user preferences) plus its own considerations. For example, this would allow the OEM to monetize C-V2X operation for specific customers and their associated subscriptions.

In an aspect, the IVS can select a subscription to clone onto the user SIM slot (e.g., one of SIM slots 370) based on the C-V2X availability information and, optionally, the factors indicating the need, or lack thereof, for C-V2X connectivity. Currently, most V2X driver assistance operations (excluding V2P assistance to pedestrians) is only permitted to be transmitted by the IVS and not by a user's personal device (e.g., smartphone). Even an eCall or next generation eCall (NGeCall) can only be placed from the IVS.

Accordingly, the present disclosure provides techniques to use the C-V2X availability and need information described herein to determine which available subscription to choose for the current operation of the IVS modem (e.g., modem 304). For example, if the OEM SIM does not support C-V2X at a given location (along the travel route) and the user has specified a preference for V2X, the IVS can check whether any of the user subscriptions that can be cloned to the IVS modem are capable of providing C-V2X service at that location. If one can, the IVS may clone that subscription to the user SIM slot (e.g., a SIM slot 370).

If at some later point during the trip the OEM subscription is once again able to provide C-V2X service, the IVS modem can fall back to the OEM subscription to provide V2X assistance. This determination can be based on a handshaking mechanism with the OEM server using the OEM subscription. In addition, the same type of technique can be extended to clone an NGeCall-capable subscription to the IVS modem when the default OEM subscription does not support NGeCall on the current cell.

Note that it may not always be possible to support both C-V2X and eCall. Further, some jurisdictions may have a requirement to provide C-V2X, if available, and other jurisdictions may have a requirement to provide eCall service, if available. Where only one can be provided, which service is given priority would be determined by the legal requirements of the relevant jurisdiction.

Figure 5:
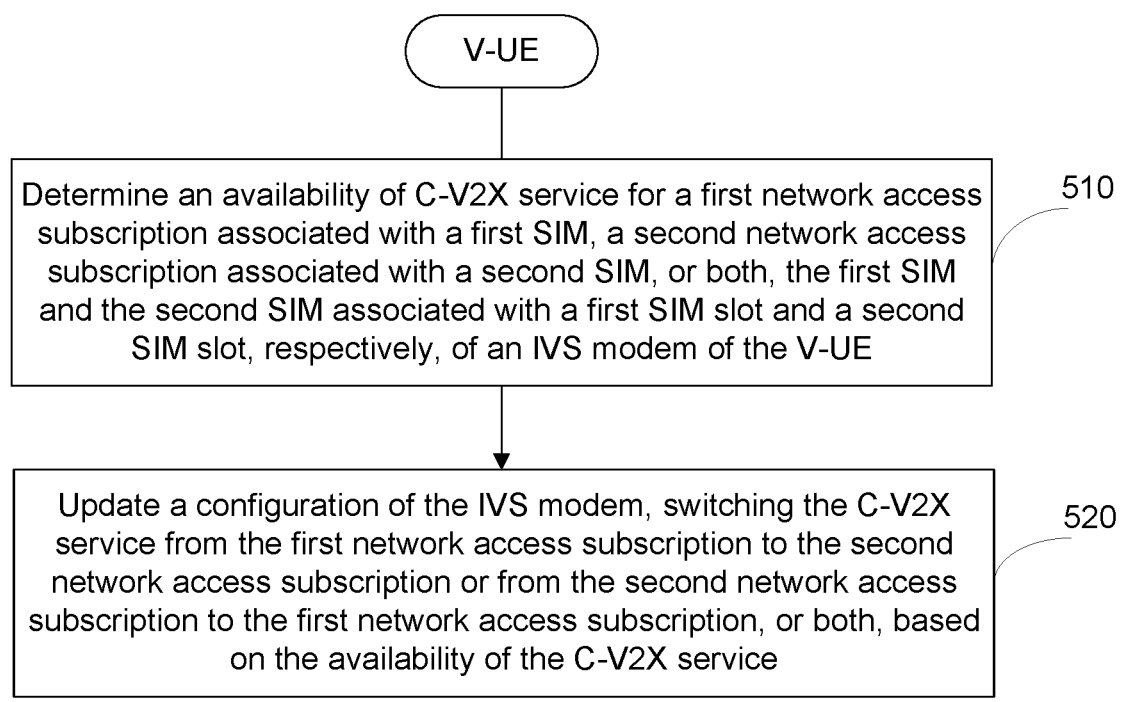
FIG. 5 illustrates an example method of wireless communication, according to aspects of the disclosure.

FIG. 5 illustrates an example method 500 of wireless communication, according to aspects of the disclosure. In an aspect, method 500 may be performed by a V-UE (e.g., any of the V-UEs described herein, such as V-UE 300).

At 510, the V-UE determines an availability of C-V2X service for a first network access subscription associated with a first SIM (e.g., OEM SIM 430), a second network access subscription associated with a second SIM (e.g., user SIM 420), or both, the first SIM and the second SIM associated with a first SIM slot and a second SIM slot (e.g., SIM slots 370), respectively, of an IVS modem (e.g., modem 304) of the V-UE. In an aspect, operation 510 may be performed by modem 304, processing system 310, and/or memory 314, any or all of which may be considered means for performing this operation.

At 520, the V-UE updates a configuration of the IVS modem, switches the C-V2X service from the first network access subscription to the second network access subscription or from the second network access subscription to the first network access subscription, or both, based on the availability of the C-V2X service. In an aspect, operation 520 may be performed by modem 304, processing system 310, and/or memory 314, any or all of which may be considered means for performing this operation.

As will be appreciated, a technical advantage of the method 500 is the ability to dynamically determine the configuration of the IVS modem for an improved V2X experience and maximum utilization of the device's capability.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a vehicle user equipment (V-UE), comprising: determining an availability of cellular vehicle-to-everything (C-V2X)

service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and updating a configuration of the IVS modem, switching the C-V2X service from the first network access subscription to the second network access subscription or from the second network access subscription to the first network access subscription, or both, based on the availability of the C-V2X service.

Clause 2. The method of clause 1, further comprising: determining a route from an origin location to a destination location; and retrieving C-V2X availability data for the route, wherein determining the availability of the C-V2X service is based on the C-V2X availability data for the route.

Clause 3. The method of clause 2, wherein the retrieving comprises: retrieving the C-V2X availability data for the route from a crowdsourcing server.

Clause 4. The method of any of clauses 2 to 3, wherein the C-V2X availability data for the route comprises locations of roadside C-V2X access points along the route, historic C-V2X connectivity along the route of other V-UEs, current C-V2X connectivity along the route of other V-UEs, or any combination thereof.

Clause 5. The method of any of clauses 2 to 4, wherein the origin location is a current location of the V-UE.

Clause 6. The method of any of clauses 2 to 5, further comprising: altering the route to increase C-V2X availability along the route based on the C-V2X availability data for the route.

Clause 7. The method of any of clauses 2 to 6, wherein updating the configuration, switching the C-V2X service, or both is further based on one or more factors related to a need for the C-V2X service along the route.

Clause 8. The method of clause 7, wherein the one or more factors include known traffic conditions along the route, known hazards along the route, or both.

Clause 9. The method of any of clauses 7 to 8, wherein updating the configuration of the IVS modem comprises: setting the configuration of the IVS modem to a configuration that does not support the C-V2X service based on the C-V2X service not being available and the one or more factors indicating that there is no need for the C-V2X service along the route.

Clause 10. The method of any of clauses 1 to 9, wherein determining the availability of the C-V2X service is based on a type of system information block (SIB) broadcasted by a cell to which the IVS modem can connect.

Clause 11. The method of any of clauses 1 to 10, wherein updating the configuration, switching the C-V2X service, or both is further based on user preferences to have the C-V2X service.

Clause 12. The method of any of clauses 1 to 11, wherein updating the configuration, switching the C-V2X service, or both is further based on legal requirements for the V-UE to have the C-V2X service.

Clause 13. The method of any of clauses 1 to 12, further comprising: transmitting the determined availability of the C-V2X service and a current location of the V-UE to a crowdsourcing server.

Clause 14. The method of any of clauses 1 to 13, further comprising: transmitting the determined availability of the C-V2X service to a third-party server.

Clause 15. The method of clause 14, further comprising: receiving one or more instructions from an original equipment manufacturer (OEM) to update the configuration of the IVS modem, to switch the C-V2X service, or both.

Clause 16. The method of any of clauses 1 to 15, wherein updating the configuration of the IVS modem comprises: setting the configuration of the IVS modem to a configuration that does not support the C-V2X service based on the C-V2X service not being available.

Clause 17. The method of any of clauses 1 to 15, wherein updating the configuration of the IVS modem comprises: setting the configuration of the IVS modem to a configuration that supports the C-V2X service based on the C-V2X service being available.

Clause 18. The method of any of clauses 1 to 17, wherein: the first network access subscription is a default network access subscription, and the second network access subscription is a user network access subscription.

Clause 19. The method of clause 18, wherein: the C-V2X service is not available for the default network access subscription, the C-V2X service is available for the user network access subscription, and switching the C-V2X service comprises: switching the C-V2X service from the default network access subscription to the user network access subscription based on the C-V2X service being available for the user network access subscription and not the default network access subscription.

Clause 20. The method of clause 19, further comprising: switching the C-V2X service from the second network access subscription back to the first network access subscription based on the C-V2X service being available for the first network access subscription.

Clause 21. The method of clause 19, further comprising: receiving one or more instructions from an OEM to switch the C-V2X service from the first network access subscription to the second network access subscription, from the second network access subscription back to the first network access subscription, or both.

Clause 22. The method of any of clauses 19 to 21, wherein switching the C-V2X service comprises: cloning the user network access subscription to the second SIM slot.

Clause 23. The method of any of clauses 18 to 21, wherein: an emergency call (eCall) service is not available for the default network access subscription, the eCall service is available for the user network access subscription, the method further comprising: switching to the user network access subscription based on the eCall service being available for the user network access subscription and not the default network access subscription.

Clause 24. An apparatus comprising a memory and at least one processor communicatively coupled to the memory, the memory and the at least one processor configured to perform a method according to any of clauses 1 to 23.

Clause 25. An apparatus comprising means for performing a method according to any of clauses 1 to 23.

Clause 26. A non-transitory computer-readable medium storing computer-executable instructions, the computer-executable comprising at least one instruction for causing a computer or processor to perform a method according to any of clauses 1 to 23.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a vehicle user equipment (V-UE), comprising:
    determining an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and
    updating a configuration of the IVS modem, switching the C-V2X service from the first network access subscription to the second network access subscription or from the second network access subscription to the first network access subscription, or both, based on the availability of the C-V2X service.

2. The method of claim 1, further comprising:
    determining a route from an origin location to a destination location; and
    retrieving C-V2X availability data for the route,
    wherein determining the availability of the C-V2X service is based on the C-V2X availability data for the route.

3. The method of claim 2, wherein the retrieving comprises:
    retrieving the C-V2X availability data for the route from a crowdsourcing server.

4. The method of claim 2, wherein the C-V2X availability data for the route comprises locations of roadside C-V2X access points along the route, historic C-V2X connectivity along the route of other V-UEs, current C-V2X connectivity along the route of other V-UEs, or any combination thereof.

5. The method of claim 2, wherein the origin location is a current location of the V-UE.

6. The method of claim 2, further comprising:
    altering the route to increase C-V2X availability along the route based on the C-V2X availability data for the route.

7. The method of claim 2, wherein updating the configuration, switching the C-V2X service, or both is further based on one or more factors related to a need for the C-V2X service along the route.

8. The method of claim 7, wherein the one or more factors include known traffic conditions along the route, known hazards along the route, or both.

9. The method of claim 7, wherein updating the configuration of the IVS modem comprises:
setting the configuration of the IVS modem to a configuration that does not support the C-V2X service based on the C-V2X service not being available and the one or more factors indicating that there is no need for the C-V2X service along the route.

10. The method of claim 1, wherein determining the availability of the C-V2X service is based on a type of system information block (SIB) broadcasted by a cell to which the IVS modem can connect.

11. The method of claim 1, wherein updating the configuration, switching the C-V2X service, or both is further based on user preferences to have the C-V2X service.

12. The method of claim 1, wherein updating the configuration, switching the C-V2X service, or both is further based on legal requirements for the V-UE to have the C-V2X service.

13. The method of claim 1, further comprising:
transmitting the determined availability of the C-V2X service and a current location of the V-UE to a crowd-sourcing server.

14. The method of claim 1, further comprising:
transmitting the determined availability of the C-V2X service to a third-party server.

15. The method of claim 14, further comprising:
receiving one or more instructions from an original equipment manufacturer (OEM) to update the configuration of the IVS modem, to switch the C-V2X service, or both.

16. The method of claim 1, wherein updating the configuration of the IVS modem comprises:
setting the configuration of the IVS modem to a configuration that does not support the C-V2X service based on the C-V2X service not being available.

17. The method of claim 1, wherein updating the configuration of the IVS modem comprises:
setting the configuration of the IVS modem to a configuration that supports the C-V2X service based on the C-V2X service being available.

18. The method of claim 1, wherein:
the first network access subscription is a default network access subscription, and
the second network access subscription is a user network access subscription.

19. The method of claim 18, wherein:
the C-V2X service is not available for the default network access subscription,
the C-V2X service is available for the user network access subscription, and
switching the C-V2X service comprises:
switching the C-V2X service from the default network access subscription to the user network access subscription based on the C-V2X service being available for the user network access subscription and not the default network access subscription.

20. The method of claim 19, further comprising:
switching the C-V2X service from the second network access subscription back to the first network access subscription based on the C-V2X service being available for the first network access subscription.

21. The method of claim 19, further comprising:
receiving one or more instructions from an OEM to switch the C-V2X service from the first network access subscription to the second network access subscription, from the second network access subscription back to the first network access subscription, or both.

22. The method of claim 19, wherein switching the C-V2X service comprises:
cloning the user network access subscription to the second SIM slot.

23. The method of claim 18, wherein:
an emergency call (eCall) service is not available for the default network access subscription,
the eCall service is available for the user network access subscription,
the method further comprising:
switching to the user network access subscription based on the eCall service being available for the user network access subscription and not the default network access subscription.

24. A vehicle user equipment (V-UE), comprising:
a memory;
a modem; and
at least one processor communicatively coupled to the memory and the modem, the at least one processor configured to:
determine an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and
update a configuration of the IVS modem, switching the C-V2X service from the first network access subscription to the second network access subscription or from the second network access subscription to the first network access subscription, or both, based on the availability of the C-V2X service.

25. The V-UE of claim 24, wherein the at least one processor is further configured to:
determine a route from an origin location to a destination location; and
retrieve C-V2X availability data for the route,
wherein determining the availability of the C-V2X service is based on the C-V2X availability data for the route.

26. The V-UE of claim 25, wherein the at least one processor being configured to retrieve comprises the at least one processor being configured to:
retrieve the C-V2X availability data for the route from a crowdsourcing server.

27. The V-UE of claim 25, wherein the C-V2X availability data for the route comprises locations of roadside C-V2X access points along the route, historic C-V2X connectivity along the route of other V-UEs, current C-V2X connectivity along the route of other V-UEs, or any combination thereof.

28. The V-UE of claim 25, wherein the origin location is a current location of the V-UE.

29. The V-UE of claim 25, wherein the at least one processor is further configured to:
alter the route to increase C-V2X availability along the route based on the C-V2X availability data for the route.

30. The V-UE of claim 25, wherein the at least one processor being configured to update the configuration, switch the C-V2X service, or both is further based on one or more factors related to a need for the C-V2X service along the route.

31. The V-UE of claim 30, wherein the one or more factors include known traffic conditions along the route, known hazards along the route, or both.

32. The V-UE of claim 30, wherein the at least one processor being configured to update the configuration of the IVS modem comprises the at least one processor being configured to:
set the configuration of the IVS modem to a configuration that does not support the C-V2X service based on the C-V2X service not being available and the one or more factors indicating that there is no need for the C-V2X service along the route.

33. The V-UE of claim 24, wherein the at least one processor being configured to determine the availability of the C-V2X service is based on a type of system information block (SIB) broadcasted by a cell to which the IVS modem can connect.

34. The V-UE of claim 24, wherein the at least one processor being configured to update the configuration, switch the C-V2X service, or both is further based on user preferences to have the C-V2X service.

35. The V-UE of claim 24, wherein the at least one processor being configured to update the configuration, switch the C-V2X service, or both is further based on legal requirements for the V-UE to have the C-V2X service.

36. The V-UE of claim 24, wherein the at least one processor is further configured to:
cause the modem to transmit the determined availability of the C-V2X service and a current location of the V-UE to a crowdsourcing server.

37. The V-UE of claim 24, wherein the at least one processor is further configured to:
cause the modem to transmit the determined availability of the C-V2X service to a third-party server.

38. The V-UE of claim 37, wherein the at least one processor is further configured to:
receive, via the modem, one or more instructions from an original equipment manufacturer (OEM) to update the configuration of the IVS modem, to switch the C-V2X service, or both.

39. The V-UE of claim 24, wherein the at least one processor being configured to update the configuration of the IVS modem comprises the at least one processor being configured to:
set the configuration of the IVS modem to a configuration that does not support the C-V2X service based on the C-V2X service not being available.

40. The V-UE of claim 24, wherein the at least one processor being configured to update the configuration of the IVS modem comprises the at least one processor being configured to:
set the configuration of the IVS modem to a configuration that supports the C-V2X service based on the C-V2X service being available.

41. The V-UE of claim 24, wherein:
the first network access subscription is a default network access subscription, and
the second network access subscription is a user network access subscription.

42. The V-UE of claim 41, wherein:
the C-V2X service is not available for the default network access subscription,
the C-V2X service is available for the user network access subscription, and
the at least one processor being configured to switch the C-V2X service comprises the at least one processor being configured to:
switch the C-V2X service from the default network access subscription to the user network access subscription based on the C-V2X service being available for the user network access subscription and not the default network access subscription.

43. The V-UE of claim 42, wherein the at least one processor is further configured to:
switching the C-V2X service from the second network access subscription back to the first network access subscription based on the C-V2X service being available for the first network access subscription.

44. The V-UE of claim 42, wherein the at least one processor is further configured to:
receive, via the modem, one or more instructions from an OEM to switch the C-V2X service from the first network access subscription to the second network access subscription, from the second network access subscription back to the first network access subscription, or both.

45. The V-UE of claim 42, wherein the at least one processor being configured to switch the C-V2X service comprises the at least one processor being configured to:
clone the user network access subscription to the second SIM slot.

46. The V-UE of claim 41, wherein:
an emergency call (eCall) service is not available for the default network access subscription,
the eCall service is available for the user network access subscription,
the at least one processor is further configured to:
switch to the user network access subscription based on the eCall service being available for the user network access subscription and not the default network access subscription.

47. A vehicle user equipment (V-UE), comprising:
means for determining an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and
means for updating a configuration of the IVS modem, switching the C-V2X service from the first network access subscription to the second network access subscription or from the second network access subscription to the first network access subscription, or both, based on the availability of the C-V2X service.

48. A non-transitory computer-readable medium storing computer-executable instructions that, when executed by a vehicle user equipment (V-UE), cause the vehicle user equipment (V-UE) to:
determine an availability of cellular vehicle-to-everything (C-V2X) service for a first network access subscription associated with a first subscriber identity module (SIM), a second network access subscription associated with a second SIM, or both, the first SIM and the second SIM associated with a first SIM slot and a second SIM slot, respectively, of an in-vehicle system (IVS) modem of the V-UE; and
update a configuration of the IVS modem, switching the C-V2X service from the first network access subscription to the second network access subscription or from the second network access subscription to the first network access subscription, or both, based on the availability of the C-V2X service.

\* \* \* \* \*